(12) United States Patent
Trzecieski

(10) Patent No.: US 11,326,962 B2
(45) Date of Patent: May 10, 2022

(54) TEMPERATURE MEASUREMENT DEVICE FOR MEASURING A TEMPERATURE OF A VAPORIZATION ELEMENT

(71) Applicant: GSEH Holistic, Inc., Vancouver (CA)

(72) Inventor: Michael Alexander Trzecieski, Toronto (CA)

(73) Assignee: GSEH Holistic, Inc., Vancouver (CA)

( * ) Notice: Subject to any disclaimer, the term of this patent is extended or adjusted under 35 U.S.C. 154(b) by 206 days.

(21) Appl. No.: 16/689,614

(22) Filed: Nov. 20, 2019

(65) Prior Publication Data

US 2020/0158578 A1     May 21, 2020

Related U.S. Application Data

(60) Provisional application No. 62/770,168, filed on Nov. 20, 2018.

(51) Int. Cl.
| | |
|---|---|
| *G01K 1/00* | (2006.01) |
| *G01K 7/00* | (2006.01) |
| *G01K 11/02* | (2006.01) |
| *H05B 1/02* | (2006.01) |

(52) U.S. Cl.
CPC ............ *G01K 11/02* (2013.01); *H05B 1/0244* (2013.01)

(58) Field of Classification Search
USPC ........................................ 374/208, 183, 141
See application file for complete search history.

(56) References Cited

U.S. PATENT DOCUMENTS

| | | | |
|---|---|---|---|
| 2010/0126516 A1* | 5/2010 | Yomtov | A24F 1/30 131/173 |
| 2017/0065776 A1* | 3/2017 | Trzecieski | A24F 1/30 |
| 2018/0221604 A1* | 8/2018 | Trzecieski | A24F 40/46 |
| 2019/0373679 A1* | 12/2019 | Fu | H05B 1/0244 |
| 2020/0120993 A1* | 4/2020 | Atkins | H05B 1/0297 |
| 2021/0274843 A1* | 9/2021 | Trzecieski | A24F 40/44 |

\* cited by examiner

*Primary Examiner* — Mirellys Jagan
(74) *Attorney, Agent, or Firm* — Bereskin & Parr LLP/S.E.N.C.R.L., s.r.l.

(57) ABSTRACT

A temperature measurement device for measuring a temperature of a heating element that may have a floor is disclosed. The temperature measurement device may be formed from an arm comprising a first end for contacting the floor and a second end. A temperature sensor disposed at the first end of the arm and for generating a first temperature signal. A base unit is found at the second end of the arm that includes a control circuit electrically coupled with the temperature sensor and a battery and a temperature indication unit, the control circuit for receiving of the first temperature signal and for displaying a visual representation of the temperature signal on the temperature indication unit, wherein the temperature measurement device has a weight where the weight of the temperature measurement device presses the first end against the vaporization element and in some embodiments the floor of the vaporization element for thermally coupling the temperature sensor with the vaporization element.

14 Claims, 5 Drawing Sheets

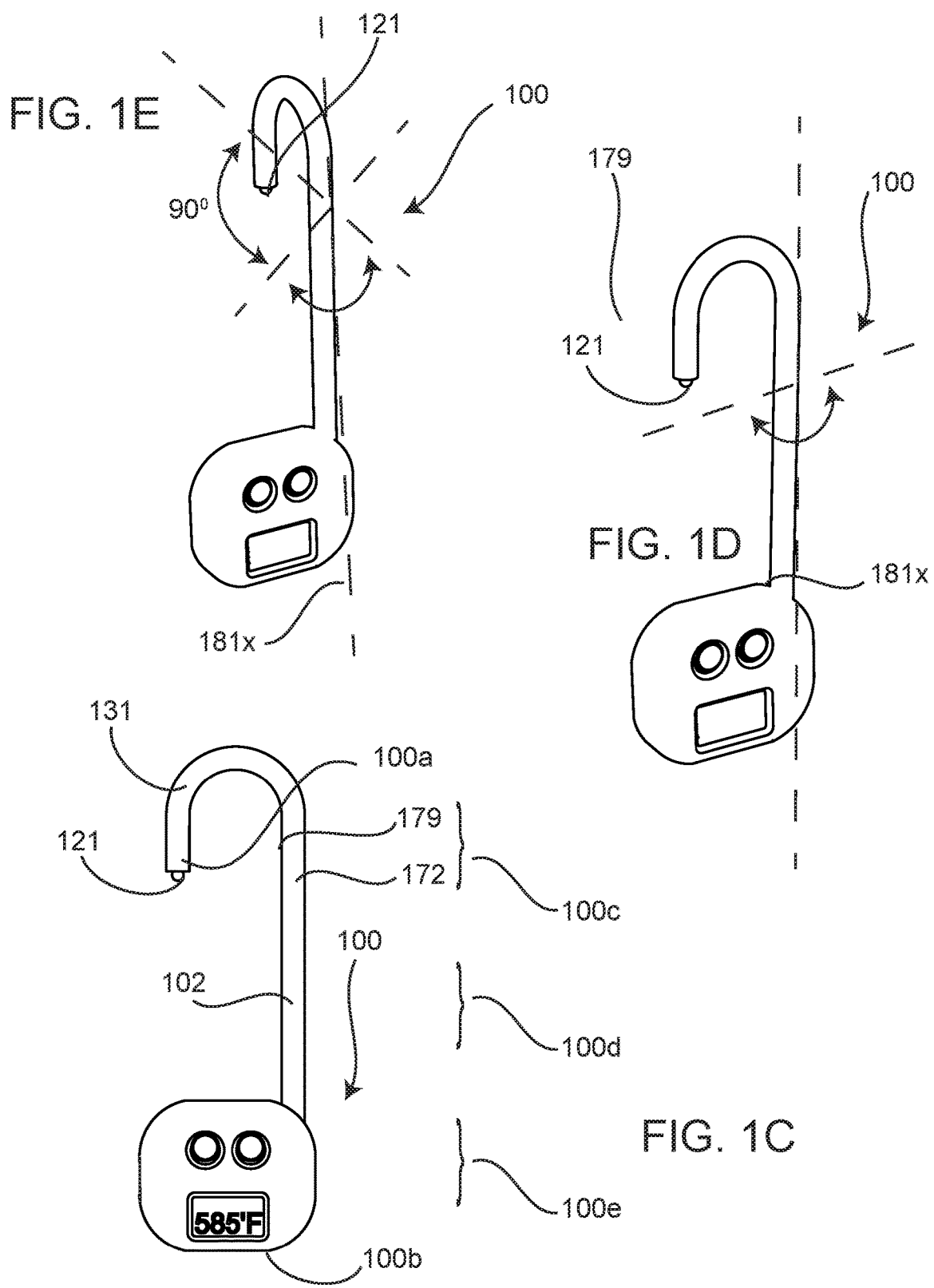

TEMPERATURE MEASUREMENT DEVICE FOR MEASURING A TEMPERATURE OF A VAPORIZATION ELEMENT

CROSS-REFERENCE TO RELATED APPLICATIONS

This application claims the benefit of U.S. Provisional Application No. 62/770,168, filed Nov. 20, 2018, the entirety of which is incorporated herein by reference.

FIELD OF THE INVENTION

The technical field relates to temperature measurement and more specifically to a device for temperature measurement to be used in conjunction with equipment for vaporization of phyto materials.

INTRODUCTION

Aromatherapy generally uses essential oils, which are extracted from phyto materials, such as leaves of plants, for therapeutic benefits. These essential oils are either massaged into the skin or can be inhaled. In some cases, the phyto materials are heated in order to release the essential oils therefrom through an aerosol. By heating these phyto materials at predetermined temperatures, essential oils and extracts are boiled off, depending upon the temperature at which these phyto materials are heated, a vapor or aerosol is given off, which is then inhaled by a user for its therapeutic benefits. Devices that provide such operation are generally known as vaporizers. There are also extracts available that are derived from the phyto material or loose-leaf aromatherapy materials and these have a consistency of honey and are typically highly purified forms. Normally these extracts are vaporized at temperatures between 500 to 700 degrees Fahrenheit.

Devices that process these concentrated phyto material extracts typically include a waterpipe, or bong, that has an input port and an inhalation aperture with a fluid pathway formed therebetween. Normally a metal or ceramic or quartz vaporization element is inserted into the input port and it is heated with a torch to get it to reach a temperature of about 500 to 700 degrees Fahrenheit.

Phyto material extract is applied to the vaporization element and a user inhales from the inhalation aperture of the waterpipe, which results in vaporized phyto material and ambient air to flow into the inhalation aperture and into the fluid pathway for being cooled by the water which is typically contained within this fluid pathway to cool the vapor air mixture.

Because the heating is performed by a torch, such devices do not typically vaporize the concentrated phyto material extracts and instead combust them by heating the extracts to a much too high temperature. Heating to combustion temperatures usually results in smoke and other combustion by products to be inhaled by an end user.

This combustion of course isn't a safe process as there are many harmful byproducts released in the combustion process. Glass vaporization surfaces are preferable over ceramic as these materials offer an improved taste of vapor that may be generated from the heating of the extract by the vaporization element.

Measurement of the temperature of the vaporization element is typically not measured using temperature measuring equipment and usually the process is a visual or time based one. For example, the metal or ceramic or glass vaporization element is heated with a torch until it glows red hot and then a timer is set and a countdown period is initiated whereby the vaporization element is allowed to cool in order for this vaporization element to reach a temperature that is cooler that perhaps doesn't combust the extract.

Other means are to use a temperature gun or temperature probe, such as a k thermocouple probe and meter, to probe the vaporization element prior to its use, however these are bulky in size and tend not to be very portable and easy to take on the road. Furthermore, many temperature guns do not measure accurately because of the small size of the vaporization element as well as the emissivity of the vaporization element and the temperature gun not being calibrated for this type of non-contact temperature measuring of the vaporization element.

Using a timer is not very scientific and taking a temperature probe on the road is not very portable. As such, it is therefore an object of the invention to provide a temperature measurement device that overcomes the aforementioned deficiencies.

It is therefore an object of the invention to provide a temperature measurement device that overcomes the aforementioned deficiencies.

SUMMARY

The following introduction is provided to introduce the reader to the more detailed description to follow and not to limit or define any claimed or as yet unclaimed invention. One or more inventions may reside in any combination or sub-combination of the elements or process steps disclosed in any part of this document including its claims and figures.

In accordance with an aspect of this disclosure, there is provided there is provided a temperature measurement device for measuring a temperature of a heating element having a floor comprising: an arm comprising a first end for contacting the floor and a second end; a temperature sensor disposed at the first end of the arm and for generating a first temperature signal; a base unit at the second end of the arm, the base unit comprising a control circuit electrically coupled with the temperature sensor and a battery and a temperature indication unit, the control circuit for receiving of the first temperature signal and for displaying a visual representation of the temperature signal on the temperature indication unit, wherein the temperature measurement has a weight where the weight of the temperature measurement device presses the first end against the floor of the vaporization element for thermally coupling the temperature sensor with floor of the heating element.

In some embodiments, the arm comprises a U-shaped bend between the first end and the second end and where U-shaped bend of the arm comprises a first arm and a second arm where the first arm is for coupling with the temperature sensor proximate the first end and the second arm for coupling with the base unit proximate the second end and the first arm is shorter than the second arm and where the first arm may be approximately parallel to the second arm.

In some embodiments the arm comprises a flexible coupling between the first end and the second end and where the arm further comprises a first arm and a second arm where the first arm is for coupling with the temperature sensor proximate the first end and the second arm for coupling with the base unit proximate the second end and the first arm is shorter than the second arm and where the flexible coupling links together the first arm and the second arm and allows for creating of an other than approximately parallel relationship between the first and second arms.

In some embodiments the arm comprises a hollow tube and wires propagate within the hollow tube from the first end to the second end.

In some embodiments the arm is rotatably mounted with respect to the base unit and extends from a vertical axis from the base unit and is rotatable about the vertical axis.

In some embodiments the temperature sensor comprises a platinum RTD temperature sensor.

In some embodiments the base unit comprises a housing comprising translucent or transparent material and a colored LED is provided for illuminating the housing, wherein a color of the LED is derived from the temperature signal.

In some embodiments the temperature indication unit comprises an electronic display module for providing a digital indication of the temperature of the vaporization element.

In some embodiments the flexible coupling comprises a gooseneck coupling.

In accordance with an aspect of this disclosure a temperature measurement device for use with a vaporization element having a floor comprising: a temperature sensor for generating a first temperature signal; a base unit comprising a control circuit electrically coupled with the temperature sensor and a battery and a temperature indication unit, where the control circuit for receiving of the first temperature signal, an arm coupling the temperature sensor with the base unit and having the temperature sensor disposed at a first end thereof and the base unit at a second end thereof, the first end of the arm for being put in contact with the floor of the vaporization element and for the weight of the temperature measurement device unit for pressing of the temperature sensor against the floor of the vaporization element, the arm comprising a U shaped bend between the first end and the second end and where the arm further comprises a first arm and a second arm where the first arm is for coupling with the temperature sensor proximate the first end and the second arm for coupling with the base unit proximate the second end and the first arm is shorter than the second arm and where the first arm may be approximately parallel to the second arm and where the temperature sensor faces the base unit.

In some embodiments the temperature indication unit comprises an electronic display module for providing a digital indication of the temperature of the vaporization element.

In some embodiments the U shaped bend between the first end and the second end comprises a radius between 5 mm and 25 mm.

In some embodiments the arm comprising a flexible coupling between the first end and the second end comprising a flexible gooseneck tubing.

In accordance with an aspect of this disclosure a temperature measurement device for measuring a temperature of a vaporization element comprising an arm comprising a first end for contacting a of a vaporization element and a second end; a temperature sensor disposed at the first end of the arm and for generating a first temperature signal; a base unit at the second end of the arm, the base unit comprising a control circuit electrically coupled with the temperature sensor and a battery and a temperature indication unit, the control circuit for receiving of the first temperature signal and providing a representation of the temperature signal on the temperature indication unit, wherein the temperature measurement has a weight where the weight of the temperature measurement device frictionally engages the first end against the vaporization element for thermally coupling the temperature sensor with floor of the vaporization element.

In accordance with an aspect of this disclosure a temperature measurement device for measuring a temperature of a vaporization element comprising: a temperature sensor for generating a first temperature signal; a base unit comprising a control circuit electrically coupled with the temperature sensor and a battery and a temperature indication unit, where the control circuit for receiving of the first temperature signal, an arm coupling the temperature sensor with the base unit and having the temperature sensor disposed at a first end thereof and the base unit at a second end thereof, the first end of the arm for being put in contact with a floor of the vaporization element and for a weight of the temperature measurement device unit for pressing of the temperature sensor against the floor of the vaporization element, the arm comprising a U shaped bend between the first end and the second end and where the arm further comprises a first arm and a second arm where the first arm is for coupling with the temperature sensor proximate the first end and the second arm for coupling with the base unit proximate the second end and the first arm is shorter than the second arm and where the first arm may be approximately parallel to the second arm and where the temperature sensor faces the base unit.

In accordance with an aspect of this disclosure a temperature measurement device for measuring a temperature of a vaporization element: a temperature sensor disposed at a first end thereof and for generating a first temperature signal; a base unit disposed at a second end thereof, an arm coupling the temperature sensor with the base unit and having the temperature sensor disposed at a first end thereof and the base unit at a second end thereof, the first end of the arm for being put in contact with the floor of the vaporization element for being hooked thereto and for a weight of the temperature measurement device for frictionally engaging of the temperature sensor against the floor of the vaporization element while the temperature measurement device is suspended from the vaporization element, the base unit comprising a control circuit electrically coupled with the temperature sensor and a battery and a visual indicator comprising at least one an indicator for providing a color changing indication representative of the temperature signal and a digital display for providing a numerical value representative of the temperature signal.

In accordance with an aspect of this disclosure a temperature measurement device for use with a vaporization element having a floor for having phyto material extract disposed thereon, the temperature measurement device (TMD) comprising: a temperature sensor disposed at a first end thereof and for generating a first temperature signal; a base unit having a weight disposed at a second end thereof, an arm coupling the temperature sensor with the base unit and having the temperature sensor disposed at a first end thereof and the base unit at a second end thereof, the first end of the arm for being put in contact with the floor of the vaporization element for being hooked thereto and for the weight of the base unit for pressing of the temperature sensor against the floor of the vaporization element while the temperature measurement device is suspended from the vaporization element, the base unit comprising a control circuit electrically coupled with the temperature sensor and a battery and a visual indicator comprising at least one of an LED indicator for providing a color changing indication representative of the temperature signal and a digital display for providing a numerical value representative of the temperature signal.

BRIEF DESCRIPTION OF THE DRAWINGS

FIG. 1C illustrates a front view of a temperature measurement device (TMD);

FIG. 1D illustrates a perspective view of a temperature measurement device (TMD) with an arm rotated zero degrees;

FIG. 1E illustrates a perspective view of a temperature measurement device (TMD) with the arm rotated ninety degrees;

DETAILED DESCRIPTION

Figure 1A:
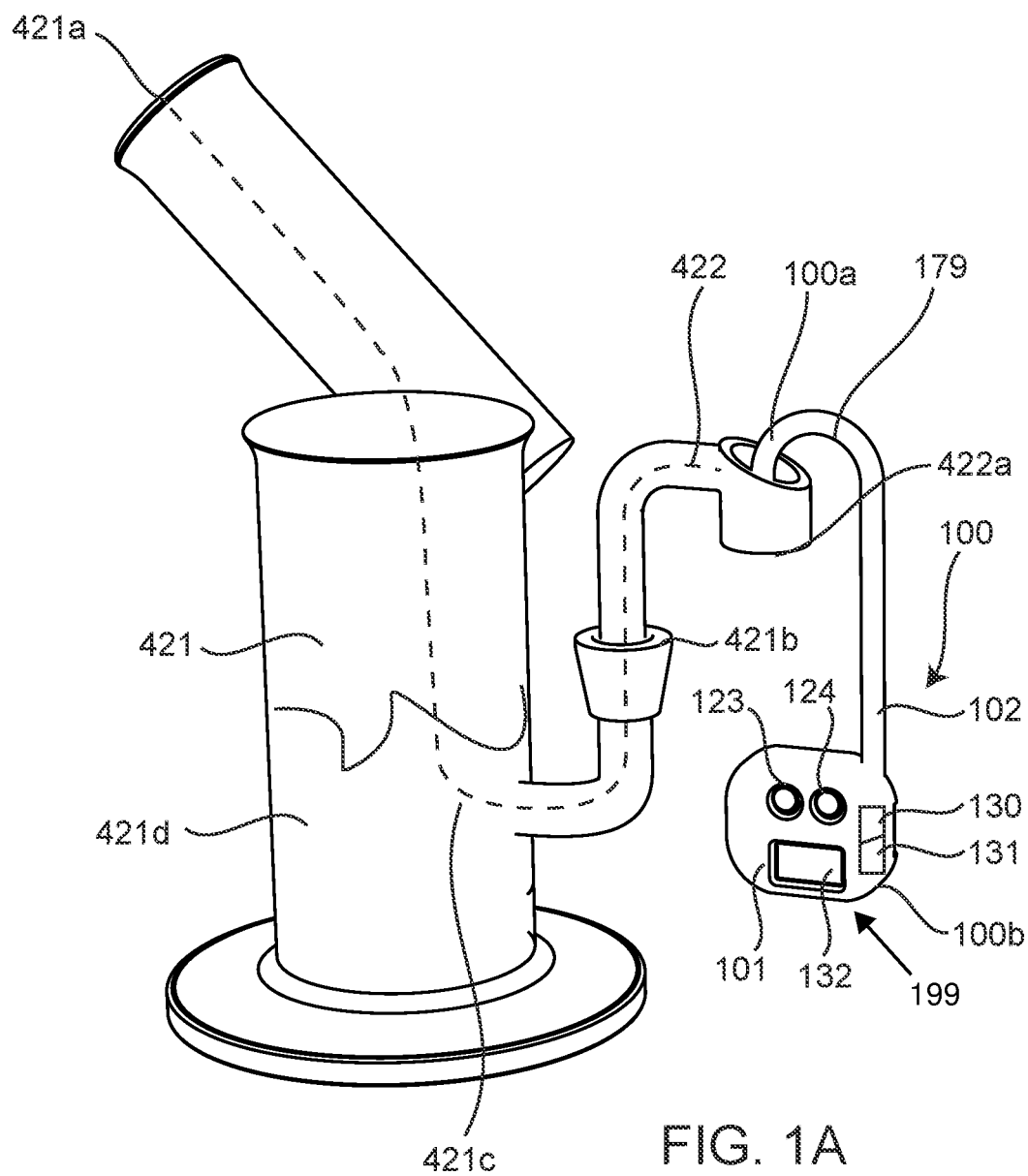
FIG. 1A illustrates an embodiment of the invention, a temperature measurement device (TMD) coupled with a vaporization element from a perspective view.
Figure 1F:
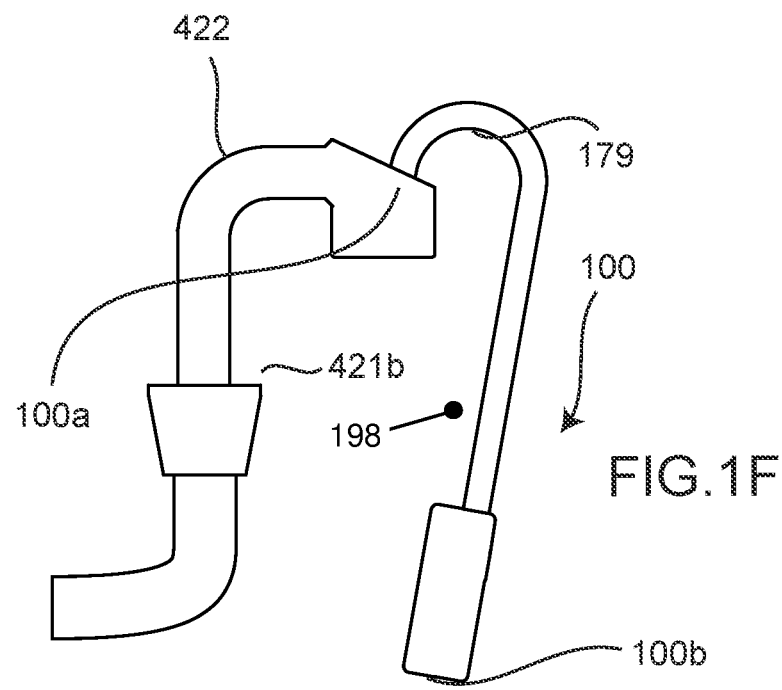
FIG. 1F illustrates a side view of a temperature measurement device (TMD) with gravity acting on the TMD as the TMD is hanging from a vaporization element.

Various apparatuses, methods and compositions are described below to provide an example of an embodiment of each claimed invention. No embodiment described below limits any claimed invention and any claimed invention may cover apparatuses and methods that differ from those described below.

The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The terms "an embodiment," "embodiment," "embodiments,", "the embodiment," "the embodiments," "one or more embodiments," "some embodiments," and "one embodiment" mean "one or more (but not all) embodiments of the present invention(s)," unless expressly specified otherwise.

The terms "including," "comprising," and variations thereof mean "including but not limited to," unless expressly specified otherwise. A listing of items does not imply that any or all of the items are mutually exclusive, unless expressly specified otherwise. The terms "a," "an," and "the" mean "one or more," unless expressly specified otherwise.

Embodiments described herein relate generally to temperature measurement devices for use with equipment for vaporization of phyto material and phyto material products. Phyto material products may be derived from phyto materials such as the leaves or buds of cannabis plants.

Phyto material is often vaporized by heating the phyto material to a predetermined vaporization temperature. The emitted phyto material vapor can then be inhaled by a user for therapeutic purposes. The vapor may often be emitted at a temperature that can be uncomfortable for a user to inhale. Accordingly, it may be desirable to provide to an end user a device that allows for the user to determine a temperature a vaporization element prior to an application of phyto material to the vaporization element. I may also be desirable to provide for a digital reading to the end user.

FIG. 1A illustrates a water pipe 421 having an input port 421b and an inhalation aperture 421a with a water pipe fluid pathway 421c formed therebetween. Within the water pipe 421 there may be a water reservoir 421d where the water pipe fluid pathway 421c propagates through the water reservoir 421d. A vaporization element 422, which may be in the form of a quartz banger as an example, is fitted into a down stem, or input port 421b, of the water pipe 421 so that it is frictionally engaged within the water pipe 421 input port 421b.

Figure 1B:
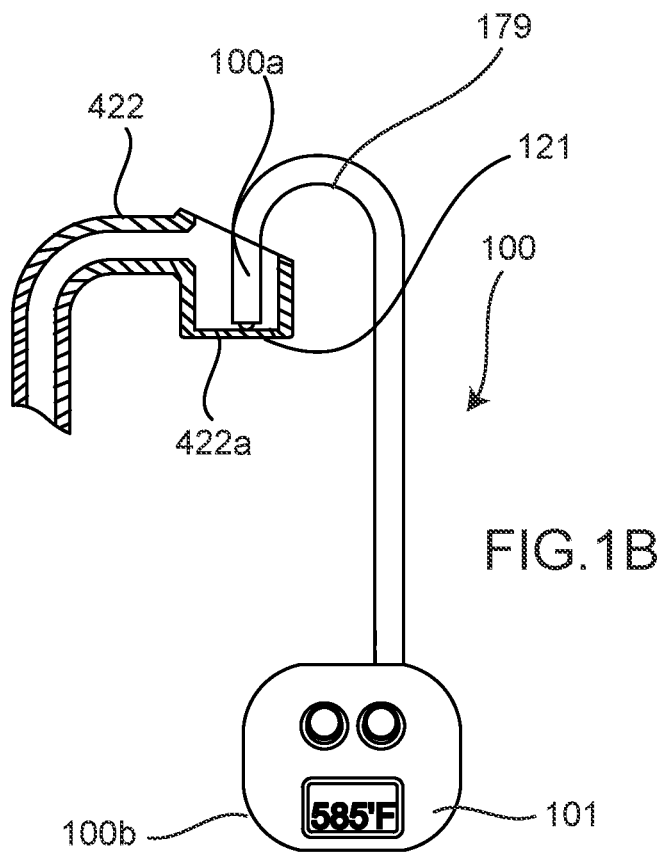
FIG. 1B illustrates a temperature measurement device (TMD) being coupled with a cutaway view of a vaporization element.
Figure 1G:
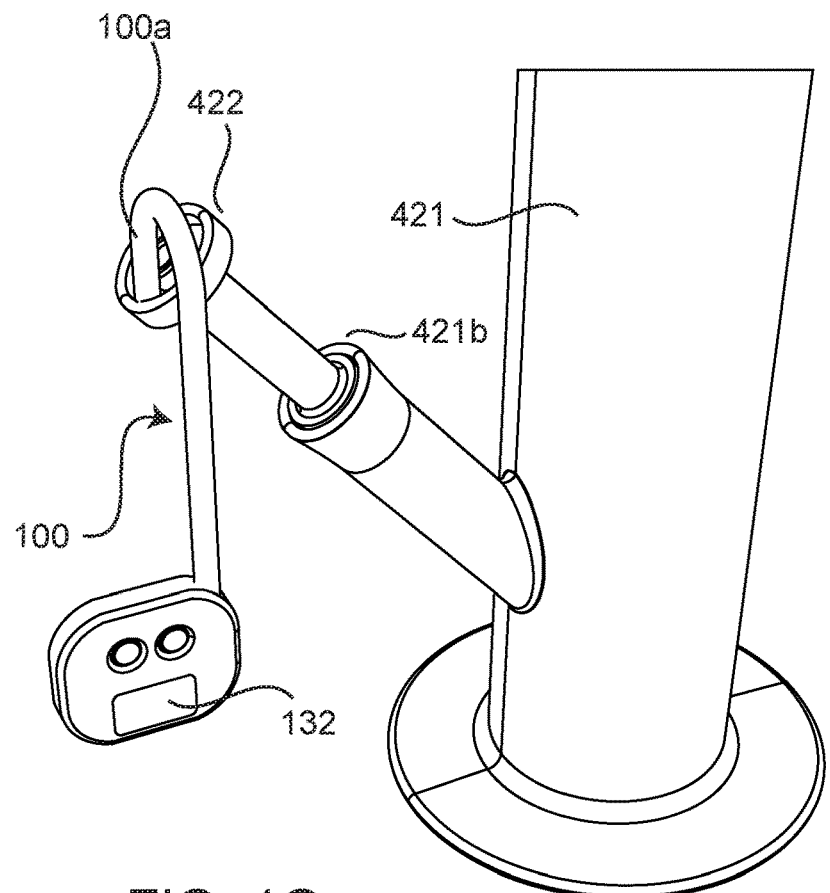
FIG. 1G illustrates a perspective view of a temperature measurement device (TMD) with gravity acting on the TMD as the TMD is hanging from a vaporization element that is in the form of an annular vaporization element oriented at an approximately 45 degree angle.
Figure 1H:
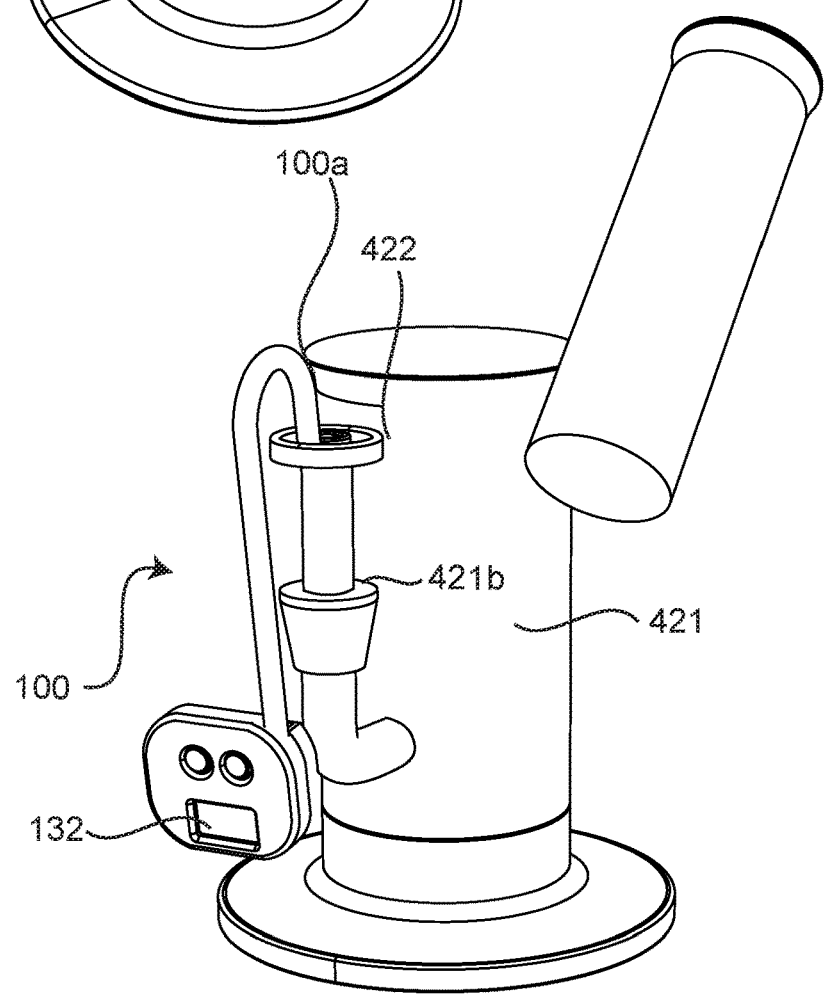
FIG. 1H illustrates a perspective view of a temperature measurement device (TMD) with gravity acting on the TMD as the TMD is hanging from a vaporization element that is in the form of an annular vaporization element oriented at an approximately a 90 degree angle.

The vaporization elements are known as bangers in some cases and these are manufactured from materials such as ceramic, quartz glass, borosilicate glass or ceramic. In some cases, the vaporization element is made from an annular ring (FIGS. 1G and 1H) which is made from titanium or ceramic, quartz glass, borosilicate glass or ceramic or other metals. In some cases, the vaporization element is integrated with the water pipe 421 and a battery housing for an all in one device. In some cases, the vaporization element is in the form of a bucket for being heated and for having of the phyto material extract disposed within the bucket (FIG. 1B). FIG. 1G illustrates a perspective view of the TMD with gravity acting on the TMD as the TMD is hanging from a vaporization element that is in the form of an annular vaporization element oriented at an approximately 45 degree angle. FIG. 1H illustrates a perspective view of the TMD with gravity acting on the TMD as the TMD is hanging from a vaporization element that is in the form of an annular vaporization element oriented at an approximately a 90 degree angle.

The vaporization elements are characterized by having a surface, or a floor, onto which phyto material extract is disposed for creation of a vapor therefrom for the user then to inhale the vapor from the inhalation aperture 421a as the vapor propagates through the water pipe fluid pathway 421c and is cooled and filtered by water that is stored in the water reservoir 421*d* of the water pipe 421.

In the current state of the art, in order to use the vaporization element with the water pipe 421 with the phyto material extract, the vaporization element is typically heated by a blow torch. The blow torch imparts thermal energy onto the vaporization element, which is heated to a desired point by the end user. Usually these vaporization elements are heated to a point where, if they are manufactured from glass (such as quartz glass), the glass glows red hot, or in the case of metal to a point where the metal also starts to glow. This is beneficial to in order to burn off any residue from the vaporization element.

Typically post heating, the user then sets a timer in order to allow a fixed amount of time for the vaporization elements of cool, say for example 30 seconds, before placing the phyto material extract onto the vaporization element for the vaporization thereof.

Unfortunately, these vaporization elements are typically heated much too high by the end user and not allowed sufficient time to cool prior to being used by the end user. As a result, when phyto material extract is applied to the vaporization elements, it is typically combusted.

Through titration the user determines whether the vaporization element is too hot or too cold after they inhale the vapor generated by the vaporization element heating the phyto material extract. If the vaporization element is too hot, then the extract is overheated and combusted and the user should then determine, they should wait longer post heating of the vaporization element before applying extracts the vaporization element.

In some cases when there's not enough of a vapor produced when the extract is placed on the vaporization element, the user then determines that the vaporization element should be heated longer or the user should not wait as long for the vaporization element to cool before placing phyto material extract onto the vaporization element.

This method significantly relies on titration, and is other than scientific. It would be advantageous to approximately know a temperature of the vaporization element prior to the application of phyto material extracts to its surface. For example, for high temperature use a desired temperature range is about 500-600° F., and for low temperature use a desired temperature range is about 350-450° F. In some embodiments the temperature may be 585° F. as may be indicated in FIG. 1C.

Some of the more advanced vaporization devices on the market offer a temperature readout and claim to provide for an accurate vaporization surface temperature, however it would be further beneficial for the end user to be better informed about the temperature at which they are vaporizing their phyto material extracts. The more advanced vaporization devices seldom offer accurate temperature readings that are within +/−5 degrees Celsius. In some cases, it would also be beneficial to know a temperature at which they are vaporizing their phyto materials that are derived from leaf.

FIGS. 1A through 1F illustrate a temperature measurement device (TMD) 100 for use in measuring a temperature of a vaporization element 422 having a floor 422*a* in accordance with a preferred embodiment of the invention. The temperature measurement device (TMD) 100 may include a temperature sensor 121, such as a resistor temperature dependent sensor, disposed at a first end 100*a* which may be for contacting the floor 422*a* of the vaporization element 422. The temperature sensor 121 may be for generating a first temperature signal in dependence upon a measured temperature of the floor 422*a* of the vaporization element 422.

The TMD 100 may further include a base unit 101 disposed at a second end thereof 100*b*. An arm 102 may be provided for coupling the temperature sensor 121 at the first end 100*a* with the base unit 101 at a second end 100*b*. The temperature sensor 121 disposed at the first end 100*a* may be electrically coupled with the base unit 101 at the second end 100*b* of the arm 102. The first end of the arm 102*a* may be for contacting the floor 422*a* of the vaporization element 422 or in some cases a sidewall of the of the vaporization element 422.

The base unit 101 may include a control circuit 130 electrically coupled with the temperature sensor 121 and a battery 131 and a temperature indication unit 199, which may include an electronic display module 132 for providing a digital temperature reading. The control circuit 130 may be for receiving of the first temperature signal from the temperature sensor 121 and in some embodiments may be for displaying a visual representation of the temperature signal on the temperature indication unit 199. The temperature indication unit 199 may be a digital character display module or a LED color indication module that indicates a temperature through color changing or combinations thereof. In some embodiments, an auditory indication may also be provided based on the first temperature signal as part of the temperature indication unit 199. In some embodiments the temperature indication unit 199 may include a LED indicator displaying a visual representation of the temperature signal through color changing, where when the temperature of the vaporization element floor 422*a* is hot and above 700 Fahrenheit the LED is red and when its below 400 Fahrenheit the LED is illuminated blue and varying colors therebetween.

When the TMD 100 is used in conjunction with a heating element or the vaporization element, the base unit 101 may be disposed below the temperature sensor 121 such that the temperature sensor 121 or the arm proximate the first end 100*a* may create a contact point with the floor 422*a* of the vaporization element, such as is show in FIG. 1B. The weight of the TMD 100 frictionally engages the temperature sensor 121 against the floor 422*a* of the vaporization element 422 may create a force towards the floor 422*a* of the vaporization element 422, which may exert an opposite force towards the temperature sensor 121 or the first end 100*a*, such as that shown in FIG. 1F. This frictionally engages the temperature sensor 121 against the floor 422*a* of the vaporization element 422 may create a thermal coupling between the floor 422*a* of the vaporization element 422 and the temperature sensor 121. FIG. 1B illustrates a cutaway view of a bucket and shows the temperature sensor 121 proximate the first end 100*a* being engaged with a floor 422*a* of the vaporization element 422.

Referring to FIGS. 1C, 1D and 1E, preferably the arm 102 comprises a U shaped bend 179 between the temperature sensor 121 and the base unit 101 between the first end 100*a* and the second end 100*b* and where the U shaped bend 179 comprises a first arm 131 and as second arm 172 where the first arm 131 is for coupling with the temperature sensor 121 proximate the first end 100*a* and the second arm 172 is for coupling with the base unit 101 proximate the second end 100*b*. The first arm 131 may be shorter than the second arm 172 and where the first arm 131 may be approximately parallel to the second arm 172. A radius of the U-shaped bend 179 is approximately 5 mm, or 20 mm to 30 mm to 35 mm to 40 mm, or 8 mm and where the U shape between the two arms faces the base unit. The arm may comprises a hollow tube and wires propagate within the hollow tube from the first end 100a to the second end 100b and couple the control circuit with the temperature sensor.

In some embodiments the first arm proximate the first end 100a is fabricated from a ceramic or thermally less conductive material then a metal material. In some embodiments this material can withstand temperatures that are about 1000 Fahrenheit without melting or deforming and in some embodiments this material may be a platinum RTD temperature sensor that is embedded within a metal housing as is known in the art.

In some embodiments the temperature sensor has may have a contact area with the vaporization element that is a smaller area than a cross sectional area of the arm such as to take away minimal heat from the vaporization element. In some embodiments the temperature sensor may protrude past the first and 100a, such as a K type thermocouple bead or a housed thermistor or other type of sensor that exhibits a temperature coefficient of resistance. In some embodiments the arm is manufactured from a metal material or a combination of metal and non-metal materials.

In some embodiments the U shaped bend 179 is disposed within a first third 100c, of the TMD 100, a second third 100d is the a portion of the arm 102 and the base unit 101 is found within a third portion 100e. Where in use the base unit 101 hangs approximately below the floor 422a of the vaporization element 422 when the first end 100a is engaged with the floor 422a of the vaporization element 422. The weight of the TMD 100 may provide for an improved thermal communication between the temperature sensor 121 proximate the first end 100a.

Referring to FIGS. 1C, 1D and 1E, in some embodiments the arm 102 may be rotatably mounted with the base unit 101 from a vertical axis 181x and is rotatable about the vertical axis 181x where the vertical axis 181x may oriented parallel with sides of the electronic display module 132 where in some embodiments, the TMD 100 hangs in place and a spatial orientation thereof in relation to the vaporization element 422 is dependent about a center of gravity 198 (FIG. 1F) of the TMD 100 and a rotation angle about the vertical axis 181x. In some embodiments the arm 102 extends upwards from the base unit 101. In some embodiments the rotatably mounted of the arm with respect to base unit 101 allows for flat packaging of the TMD 100 for ease of storage and transport.

In accordance with embodiments of the invention, TMD may provide a visual color indication of the temperature of the floor 422a of the vaporization element 422 and also optionally provides a digital display of the temperature of the floor of the vaporization element. In some embodiments, a power button 123 is provided to turn the TMD 100 to an ON functionality and to an OFF functionality conserve battery power. Optionally a mode button 124 is provided to change a temperature reading being shown when the temperature indication unit 199 includes the electronic display module 132. from Celsius to Fahrenheit.

In some embodiments the control circuit and temperature sensor is auto activated so that when a large temperature change is detected by the temperature sensor it awakes the control circuit to function as programmed and then when the temperature decrease is detected, for example when the TMD is removed, the control circuit enters a lower power mode, however this may consume additional power in standby mode and deplete the battery at a faster rate than when the ON functionality and to an OFF functionality conserve battery power is implemented within the control circuit.

Figures 2A, 2B:
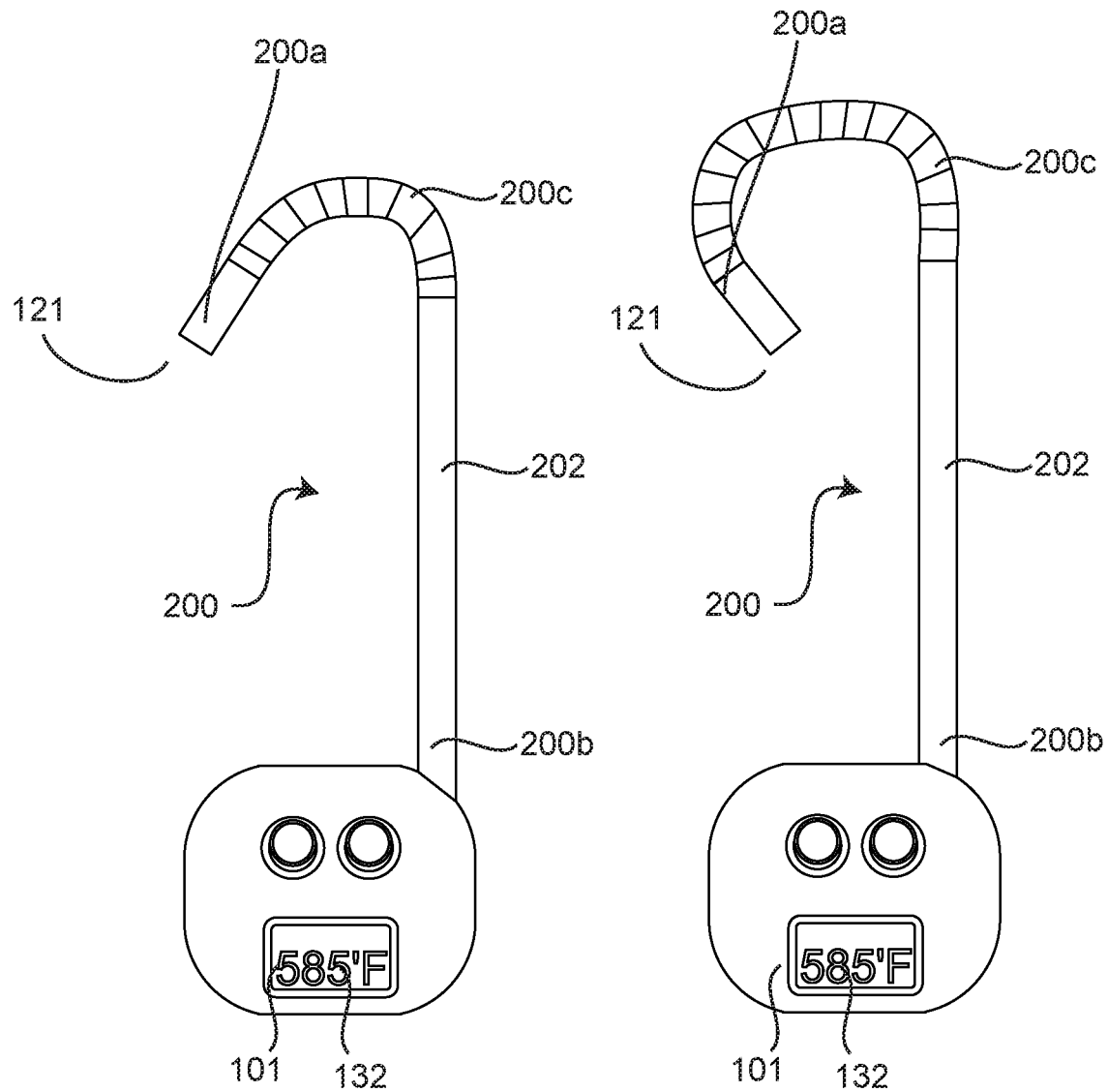
FIG. 2A illustrates front view of a temperature measurement device (TMD) showing an arm having a flexible coupling and in a first orientation.
FIG. 2B illustrates front view of a temperature measurement device (TMD) showing an arm having a flexible coupling and in a second orientation.

FIG. 2A illustrates front view of the TMD 200 showing a flexible coupling in a first orientation and FIG. 2B illustrates front view of the TMD 200 showing a flexible coupling in a second orientation. In some embodiments TMD 200 may have a flexible coupling 200c as part of the arm 202 that is formed in a center of the U shape between the first end 200a and the second end 200b. The temperature sensor 121 may be electrically coupled with the control circuit through wires propagating from the temperature sensor 121 to the control circuit through the flexible coupling 200c. The flexible coupling may be for changing an orientation of the first end 100a with respect to the base unit. In some embodiments coupling is a metal flexible coupling that maintains its orientation once set into place.

In some embodiments, the control circuit comprises a Bluetooth or Wi-Fi module for transmitting of wireless temperature data to a wireless receiver, such as a smartphone. Optionally, the arm proximate the first end thereof made from a ceramic or material with reduced thermal conductivity. Preferably the temperature sensor comprises a platinum RTD temperature sensor, where preferably the temperature sensor is able to operate up to 1500 Fahrenheit and in some embodiments its able to operate up to 1200 Fahrenheit where material for fabrication of the arm proximate the first end is able to withstand these temperatures.

In some embodiments the unit may include a housing that is translucent or transparent material and a colored LED is provided for illuminating the housing, wherein a color of the LED is indicative of the temperature of the vaporization element floor as determined by the temperature signal. In other embodiments the used may set an alarm within the control circuit and the temperature indication unit may provide an auditory or visual or vibration alarm to the end user when the vaporization surface is at their optimal temperature.

In use of the TMD in accordance with the embodiments of the invention, the user heats the vaporization element by a blow torch. The blow torch imparts thermal energy onto the vaporization element, which is heated to a desired point by the end user. Usually these vaporization elements are heated to a point where, if they are manufactured from glass (such as quartz glass), the glass glows red hot, or in the case of metal to a point where the metal also starts to glow. This is beneficial to in order to burn off any residue from the vaporization element. Post heating, the user then hangs the TMD with the first end proximate the floor of the vaporization element and waits for the temperature to be indicated on the temperature indication unit to a level which is preferably. Then the TMD is removed and the user is able to enjoy their phyto material extracts with the vaporization element. Furthermore, the In some embodiments the rotatably mounted of the arm with respect to base unit 101 allows for the hot first end of the arm to be angled away from a surface on which the TMD is rested post temperature measurement. In some cases the first end may be at a temperature that is close to a thousand degrees Fahrenheit and may cause combustion if placed on a wooden surface.

For the type of temperature sensor, a RTD (resistance temperature detector) is potentially envisaged for temperature measurement by correlating the resistance of the RTD element with temperature. In some cases the RTD consists of a film or a wire wrapped around a ceramic or glass core and in some cases platinum is used and some RTDs can also be made from nickel or copper. Preferably a platinum RTD is utilized as this offers a fairly linear temperature output signal that is accurate (0.1 to 1° C.) across a range of about 25° C. to around 600° C. Potentially a thermocouple, suck as a K type thermocouple is utilized, which consists of two wires of different metals connected at two points. The varying voltage between these two points reflects proportional changes in temperature. These sensors are nonlinear in the temperature signal they provide and may require use with a lookup table and they are also not as accurate as platinum RTD, where they have an accuracy from about 0.5° C. to 5° C., and they also operate across a wide temperature range of about 25° C. to 1750° C.

Some of the advantages of the embodiments of the invention are the TMD 100, 200 is portable, it hangs with the first end within a bowl or recess of the vaporization element, similar to a candy cane, which ensures that the temperature sensing element is in thermal contact with the surface of the vaporization element where the first end may be in a corner of the vaporization element or proximate a flat surface of the vaporization element.

The weight of the TMD resting on the temperature sensor therefore may ensure that the vaporization element may be in thermal communication for optimal heat transfer to the temperature sensor and therefore for providing of accurate temperature readings of the vaporization surface as well as a provision of a fast temperature response to the user.

Furthermore, the TME in accordance with embodiments of the invention has advantages over infrared thermometers because it is able to directly contact the vaporization element with the temperature sensor at its first end. Every material that is used for the vaporization element will radiant heat or infrared radiation at its own specific rate period. For example, ceramic or quartz glass or titanium may radiate at different heat levels as perceived by the infrared thermometer. Shiny surfaces such as titanium will also affect the readings as indicated by the infrared thermometer as will matte surfaces. As such, because of the various types of materials and the surface properties and the vaporization element temperatures, these vaporization elements will appear to have varying temperatures as perceived by the infrared thermometer. Furthermore, the proximity of the infrared thermometer to the vaporization surface and the measurements pot size of the infrared thermometer also play a role and an accuracy of the temperature that is displayed by the infrared thermometer.

It is therefore preferable to use the TMD 100, 200 in accordance with embodiments of the invention for measurement of the temperature of the vaporization element as opposed to an infrared thermometer.

Other temperature measurement devices that do not have a U shaped bend as advantageously described within the embodiments of the invention that may have a straight temperature probe that extends from the base unit will fall out from the vaporization element and may not be preferable as they will be held in place by the user and cannot be hang in place on the vaporization element and left there until the optimal temperature of the vaporization element is reached and then end user then removes the TMD and uses the vaporization element for vaporization of their phyto material extracts.

In some embodiments having a flexible coupling between the first arm and the second arm allows for the TMD to be converted into various orientation of the first end with respect to the base unit as required by the user. In some embodiments the flexible coupling is in the form of a flexible gooseneck tubing.

The TMD in accordance with embodiments of the invention is also applicable for use with electronic nails (or e-nails) where there is a vaporization element that is heater by a heating coil where it is desired to know the temperature of the vaporization element.

In some embodiments the battery 131 may be a lithium polymer battery or a coin cell battery and in some embodiments the battery may be rechargeable.

Other embodiments are also envisaged where the TMD may be used with a leaf vaporization device where the first end is placed within a bowl of the leaf vaporization device proximate the vaporization element thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

What I claim is:

1. A temperature measurement device for measuring a temperature of a vaporization element, the temperature measurement device comprising:
   an arm comprising a first end for contacting a vaporization element and a second end;
   a temperature sensor disposed at the first end of the arm, the temperature sensor for generating a first temperature signal;
   a base unit at the second end of the arm,
   the base unit comprising a control circuit, a battery and a temperature indication unit, the control circuit electrically coupled with the temperature sensor, the control circuit receiving the first temperature signal and providing a representation of the first temperature signal on the temperature indication unit and
   a weight arranged to frictionally engage the first end against the vaporization element for thermally coupling the temperature sensor with a floor of the vaporization element.

2. A temperature measurement device according to claim 1, wherein the arm is rotatably mounted with respect to the base unit, the arm extends from the base unit along a vertical axis, and the arm is rotatable about the vertical axis.

3. A temperature measurement device according to claim 1, wherein the temperature sensor comprises a platinum RTD temperature sensor.

4. A temperature measurement device according to claim 1, wherein the base unit comprises a housing, the housing comprises a translucent or transparent material and a colored LED for illuminating the housing, wherein a color of the colored LED is derived from the first temperature signal.

5. A temperature measurement device according to claim 1, wherein the temperature indication unit comprises an electronic display module for providing a digital indication of the temperature of the vaporization element.

6. A temperature measurement device according to claim 1, wherein:

the arm comprises a U-shaped bend between the first end and the second end, wherein the U shaped bend of the arm comprises a first arm section and a second arm section, wherein the first arm section is coupled with the temperature sensor proximate the first end of the arm and the second arm section is coupled with the base unit proximate the second end of the arm, wherein the first arm section is shorter than the second arm section, and wherein the first arm section is approximately parallel to the second arm section.

7. A temperature measurement device according to claim 6, wherein the arm is a hollow tube, and wires propagate within the hollow tube from the first end to the second end.

8. A temperature measurement device according to claim 1, wherein the arm comprises a flexible coupling between the first end and the second end, and wherein the arm further comprises a first arm section and a second arm section, wherein the first arm section is coupled with the temperature sensor proximate the first end of the arm and the second arm section is coupled with the base unit proximate the second end of the arm, the first arm section is shorter in length than the second arm section, and the flexible coupling links together the first arm section and the second arm section and allows for non-parallel relationship between the first arm section and the second arm section.

9. A temperature measurement device according to claim 8 wherein the flexible coupling comprises a gooseneck coupling.

10. A temperature measurement device for measuring a temperature of a vaporization element comprising:
   a temperature sensor for generating a first temperature signal;
   a base unit comprising a control circuit, a battery, and a temperature indication unit, the control circuit electrically coupled with the temperature sensor, wherein the control circuit is configured to receive the first temperature signal from the temperature sensor;
   an arm coupling the temperature sensor with the base unit, the arm having a first end and a second end, the arm having the temperature sensor disposed at the first end, the arm having the base unit disposed at the second end, the first end of the arm arranged to contact a floor of the vaporization element; and
   a weight configured to press the temperature sensor against the floor of the vaporization element,
   wherein the arm comprises a U shaped bend between the first end and the second end, wherein the arm further comprises a first arm section and a second arm section, the first arm section coupled with the temperature sensor proximate the first end of the arm and the second arm section coupled with the base unit proximate the second end of the arm, the first arm section is shorter than the second arm section, the first arm section approximately parallel to the second arm section, and the temperature sensor faces the base unit.

11. A temperature measurement device according to claim 10, wherein the temperature indication unit comprises an electronic display module for providing a digital indication of the temperature of the vaporization element.

12. A temperature measurement device according to claim 10, wherein the U shaped bend between the first end and the second end comprises a radius between 5 mm and 25 mm.

13. A temperature measurement device according to claim 10, wherein the arm comprises a flexible coupling between the first end and the second end comprising a flexible gooseneck tubing.

14. A temperature measurement device for measuring a temperature of a vaporization element comprising:
   a temperature sensor disposed at a first end of the temperature measurement device for generating a first temperature signal;
   a base unit disposed at a second end of the temperature measurement device;
   an arm coupling the temperature sensor with the base unit, the arm having a first arm end and a second arm end, the arm having the temperature sensor disposed at the first arm end and the base unit disposed at the second arm end, the first arm end arranged to contact a floor of the vaporization element, the first arm end configured to be hooked to the floor of the vaporization element; and
   a weight configured to frictionally engage the temperature sensor against the floor of the vaporization element with the temperature measurement device hanging from the vaporization element adjacent the arm,
   the base unit comprising a control circuit, a battery and a visual indicator, the control circuit electrically coupled with the temperature sensor, the base unit comprising at least one indicator for providing a color changing indication representative of the first temperature signal and a digital display for providing a numerical value representative of the first temperature signal.

* * * * *